United States Patent [19]

Takahara et al.

[11] Patent Number: 4,770,852
[45] Date of Patent: Sep. 13, 1988

[54] HOLLOW FIBER MEMBRANE FOR AN ARTIFICIAL LUNG

[75] Inventors: Kazuaki Takahara, Tokyo; Kazuhiro Shimoda, Fuji; Ken Tatebe, Hachioji; Manabu Yamazaki, Fujinomiya, all of Japan

[73] Assignee: Terumo Kabushiki Kaisha, Tokyo, Japan

[21] Appl. No.: 883,971

[22] Filed: Jul. 10, 1986

[30] Foreign Application Priority Data

Jul. 16, 1985 [JP] Japan .................. 60-155163

[51] Int. Cl.[4] .................. A61M 1/14; A61M 1/34; A61M 1/36
[52] U.S. Cl. .................. 422/48; 128/205.28; 128/DIG. 3; 210/500.36; 210/321.72; 623/12; 623/66
[58] Field of Search .................. 55/16, 58; 128/204.18, 128/205.27, 205.28, DIG. 3; 264/176 F, 209.1; 422/48; 623/1, 12, 66, 11; 210/321.4, 500.36

[56] References Cited

U.S. PATENT DOCUMENTS

| 4,127,625 | 11/1978 | Arisaka et al. | 264/209.1 |
| 4,239,729 | 12/1980 | Hasegawa et al. | 128/DIG. 3 |
| 4,355,426 | 10/1982 | MacGregor | 623/66 |
| 4,374,802 | 2/1983 | Fukasawa | 128/DIG. 3 |
| 4,550,447 | 11/1985 | Seiler, Jr. et al. | 623/12 |

FOREIGN PATENT DOCUMENTS

| 0183103 | 6/1986 | European Pat. Off. | 210/500.36 |
| 1090707 | 5/1986 | Japan | 210/500.36 |

Primary Examiner—Richard J. Apley
Assistant Examiner—Paul Prebilic
Attorney, Agent, or Firm—Frishauf, Holtz, Goodman & Woodward

[57] ABSTRACT

A porous polypropylene hollow fiber membrane of a circular cross section 150 to 300 μm in inside diameter and 10 to 150 μm in wall thickness for use in an artificial lung, which hollow fiber membrane is characterized by having an inner surface aperture ratio in the range of 10 to 30%, a porosity in the range of 10 to 60%, and an oxygen flux in the range of 100 to 1,000 liters/min.m-2.atm. and inducing no leakage of blood plasma within 20 hours use in the external circulation of blood therethrough.

11 Claims, 9 Drawing Sheets

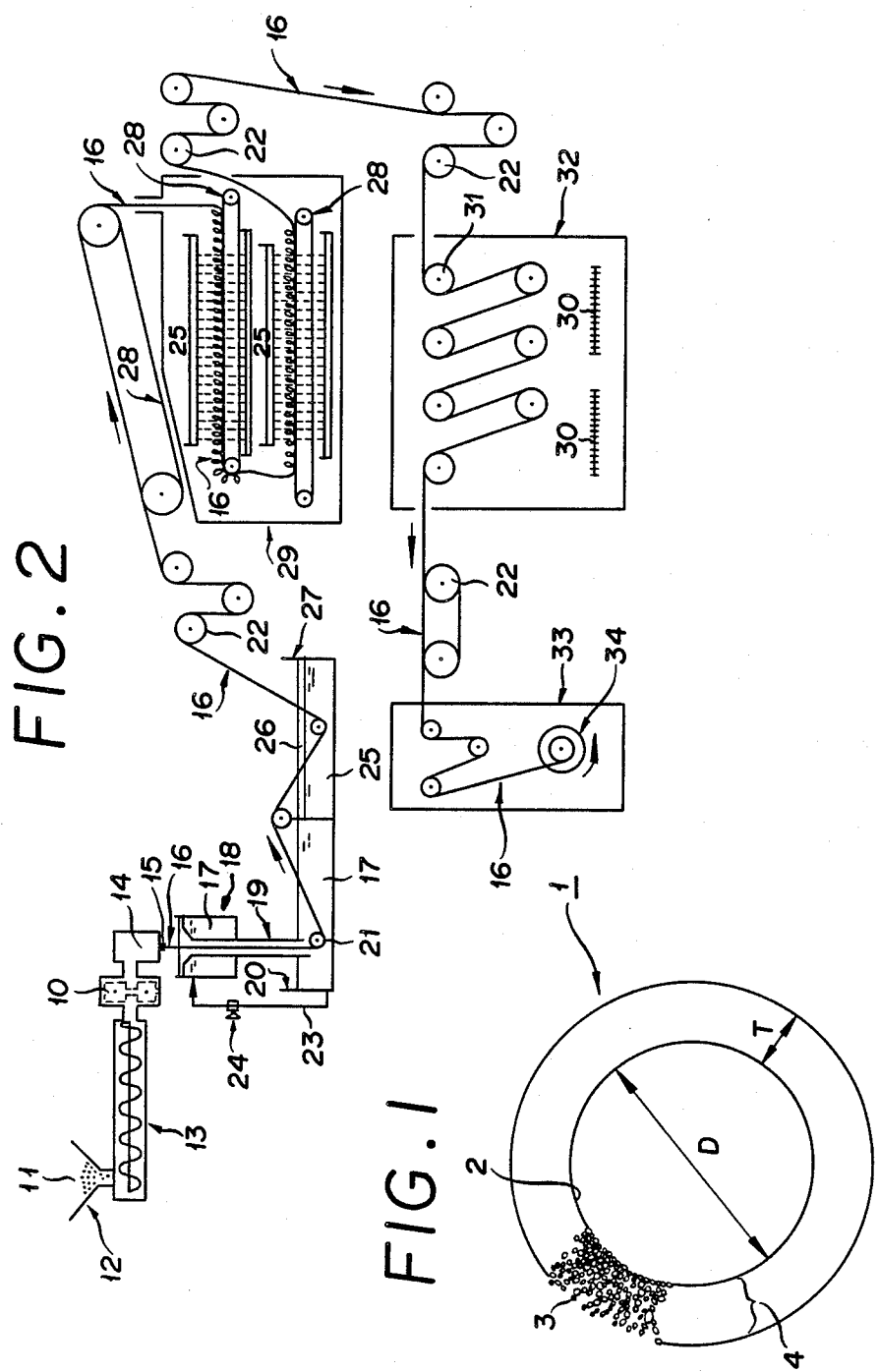

HOLLOW FIBER MEMBRANE FOR AN ARTIFICIAL LUNG

BACKGROUND OF THE INVENTION

1. Field of the Invention

This invention relates to a hollow fiber membrane for an artificial lung, a method for the manufacture thereof, and the artificial lung using the hollow fiber membrane. Particularly, this invention relates to a porous hollow fiber membrane possessing a high gas-exchange capacity, a method for the manufacture thereof, and an artificial lung using the hollow fiber membrane. More particularly, this invention relates to a porous hollow fiber membrane capable of retaining a high gas-exchange capacity during a protracted use without entailing any leakage of blood plasma and suitable for use in an artificial lung, a method for the manufacture thereof, and the artificial lung using the hollow fiber membrane.

2. Description of Prior Art

Generally in the surgical operation of the heart, for example, an artificial lung incorporating therein hollow fiber membranes is used in an external circulatory path for the purpose of leading the patient's blood out of his circulatory system, adding oxygen to the blood, and stripping the blood of carbon dioxide gas. The hollow fiber membranes offered for use in the artificial lung of this nature are broadly divided into two types; homogeneous membranes and porous membranes. The homogeneous memebranes permit the permeating gas to keep its motion by enabling the molecules of the gas to dissolve and diffuse in the membrane. A typical example of these homogeneous membranes is one made of silicone rubber which has been commercialized as Mela Silox (manufactured by Senko Ika Kogyo K.K.). Because of gas permeability considerations, however, it is only this type of homogeneous membrane of silicone rubber that has been accepted as fully serviceable to date. However, strength considerations prevent this homogeneous membrane of silicone rubber from having a thickness smaller than 100 $\mu$m. Thus, it has limited permeability to gases and exhibits particularly poor permeability to carbon dioxide gas. Moreover, the silicone rubber suffers from a disadvantage that it is expensive and is difficult to work.

The porous membranes permit the permeating gas to move through their pores as volume flow because the pores are notably large as compared with the molecules of the gas. Various artificial lungs have been proposed which use porous membranes such as microporous polypropylene membranes. For example, it has been proposed to manufacture a porous polypropylene hollow fiber by melt spinning polypropylene with a hollow fiber producing nozzle at a spinning temperature of 210° to 270° C. and a draft ratio of 180 to 600, then subjecting the extruded fiber to a first heat treatment at a temperature of not higher than 155° C., stretching the fiber at a temperature lower than 110° C. at a ratio of 30 to 200%, and thereafter subjecting the stretched fiber to a second heat treatment at a temperature exceeding the treatment of the first heat treatment and not exceeding 155° C. (Japanese Patent Publication SHO 56(1981)-52,123). In the porous hollow fiber obtained as described above, however, the pores thereof have been physically formed by stretching the hollow fiber of polypropylene. The pores formed therein, therefore, these pores are linear pores substantially horizontal in the direction of membrane thickness. Further since the pores take shape while producing cracks in the axial direction of the hollow fiber proportionately to the degree of stretching, their cross sections resemble slits. The pores continuously penetrate the wall of the hollow fiber substantially linearly and have a high porosity. As the result, the porous hollow fiber exhibits high permeability to moisture and has a disadvantage that it suffers leakage of blood plasma after a protracted use in the external circulation of blood.

As a porous membrane incapable of leakage of blood plasma, there has been proposed a porous polyolefin hollow fiber membrane which is produced by mixing a polyolefin, an organic filler capable of uniformly dispersing in the polyolefin in a fused state and easily dissolving in an extractant being used, and a crystal seed forming agent, discharging the resulting mixture in a molten state through an annular spinning nozzle and, at the same time, introducing an inert gas into the interior of the hollow fiber of the mixture, allowing the hollow fiber to contact a cooling and solidifying liquid incapable of dissolving the polyolefin, and then allowing the cooled and solidified hollow fiber to contact an extractant incapable of dissolving the polyolefin thereby extracting the organic filler from the hollow fiber (Japanese Patent Application SHO 59(1984)-210,466). The polypropylene hollow fiber membrane obtained by using a cooling and solidifying liquid to dissolve the organic filler being used does not suffer any leakage of blood plasma because the pores are small and the paths of these pores are complicated. However, this structure has the disadvantage, when used in an artificial lung, of insufficient gas-exchange capacity because it has a small pore density per unit area. Further, the polyolefin hollow fiber membrane has a possibility that the low molecular component of the polyolefin will mingle into the cooling and solidifying liquid capable of dissolving the organic filler, adhere to the inner wall of the coolant tube, and deform the hollow fiber on aging.

This invention, therefore, has an object to provide an improved hollow fiber membrane for use in an artificial lung, a method for the manufacture thereof, and an artificial lung using the hollow fiber membrane.

This invention also aims to provide a porous hollow fiber membrane possessing a high gas-exchange capacity, a method for the manufacture thereof, and an artificial lung using the hollow fiber membrane.

This invention further aims to provide a porous hollow fiber membrane made of polypropylene capable of retaining a high gas-exchange capacity during a protracted use without entailing any leakage of blood plasma and suitable for use in an artificial lung, a method for the manufacture thereof, and an artificial lung using the hollow fiber membrane.

SUMMARY OF THE INVENTION

The objects described above are accomplished by a porous polyolefin hollow fiber membrane of a circular cross section 150 to 300 $\mu$m in inside diameter and 10 to 150 $\mu$m in wall thickness for use in an artificial lung, which hollow fiber membrane is characterized by having an inner surface aperture ratio in the range of 10 to 30%, a porosity in the range of 10 to 60%, and an oxygen flux in the range of 100 to 1,000 liters/min.m$^2$.atm. and inducing no leakage of blood plasma within 20 hours use in the external circulation of blood therethrough.

This invention also discloses a hollow fiber membrane for use in an artificial lung, wherein the solid phase on the inner surface of the hollow fiber has particulate polypropylene intimately fused tightly after the pattern of a continuous phase while partly exposed on the surface, the solid phase inside the hollow fiber membrane has particulated polypropylene interlinked in the axial direction of fiber to form a multiplicity of polypropylene masses mutually bound with fibers of polypropylene, and the solid phase on the outer surface of the hollow fiber membrane has fibers of polypropylene containing particulate polypropylene reticularly bound coarsely, in interstices between these solid phases communicate with one another after the pattern of a three-dimensional network to give rise to continuous holes, the average particle diameter of the particulate polypropylene is in the range of 0.1 to 1.0 $\mu$m, the average pore diameter on the inner surface is in the range of 0.1 to 1.0 $\mu$m, the maximum value of the pore diameter distribution curve of the whole membrane is in the range of 0.02 to 0.2 $\mu$m, and the specific surface area is in the range of 10 to 40 $m^2/g$. This invention also discloses a hollow fiber membrane for use in an artificial lung, wherein the oxygen permeation coefficient is in the range of 140 to 1,400 liters/min.$m^2$.atm., and the ultimate amount of oxygen permeated is in the range of 200 to 2,000 liters/min.$m^2$.atm.

This invention further discloses a hollow fiber membrane, wherein the oxygen flux is not less than 150 liters/min.$m^2$.atm. This invention also discloses a hollow fiber membrane, wherein the ratio of the oxygen flux to the inner surface aperture ratio is in the range of 7:1 to 30:1. This invention further discloses a hollow fiber membrane, wherein the ratio of the oxygen flux to the inner surface aperture ratio is in the range of 2:1 to 13:1. Further, this invention discloses a hollow fiber membrane, wherein the quotient obtained by dividing the value of the oxygen flux by the aperture ratio and the porosity is not more than 0.7. This invention further discloses a hollow fiber membrane of a substantially true circular cross section 180 to 250 $\mu$m in inside diameter and 40 to 50 $\mu$m in wall thickness. Further, this invention discloses a hollow fiber membrane for use in an artificial lung, wherein the average particle diameter of the particulate polypropylene in the range of 0.3 to 0.5 $\mu$m, the average pore diameter of the inner surface is in the range of 0.3 to 0.6 $\mu$m, the maximum of the pore diameter distribution curve of the whole membrane is in the range of 0.02 to 0.2 $\mu$m, and the specific surface area is in the range of 10 to 40 $m^2/g$. This invention also discloses a hollow fiber membrane for use in an artificial lung, wherein the oxygen permeation coefficient is in the range of 400 to 900 liters/min.$m^2$.atm. and the ultimate amount of oxygen permeated is in the range of 600 to 1,200 liters/min.$m^2$.atm.

The objects of the invention mentioned above are attained also by a method for the manufacture of a hollow fiber membrane, characterized by the step of mixing polypropylene, an organic filler capable of uniformly dispersing in the polypropylene in a fused state and easily dissolving in an extractant being used, and a crystal seed forming agent, causing the resulting mixture in a molten state to be discharged in the shape of a hollow fiber through an annular spinning nozzle, forwarding the hollow fiber into contact with a liquid made of the organic filler or a compound similar thereto thereby cooling and solidifying the hollow fiber, and forwarding the cooled and solidified hollow thread into contact with an extractant incapable of dissolving polypropylene thereby depriving the hollow fiber of the organic filler.

This invention further discloses a method for the manufacture of a hollow fiber membrane, wherein the organic filler is liquid paraffin. This invention, and also discloses a method for the manufacture of a hollow fiber membrane, wherein the amount of the organic filler to be incorporated is in the range of 35 to 150 parts by weight based on 100 parts by weight of polypropylene. Further this invention discloses a method for the manufacture of a hollow fiber membrane, wherein the crystal seed forming agent is an organic heat-resistant substance having a melting point of not less than 150° C. and a gel point exceeding the temperature at which polypropylene beings to crystallize. This invention also discloses a method for the manufacture of a hollow fiber membrane, wherein the amount of the crystal seed forming agent to be incorporated is in the range of 0.1 to 5 parts by weight based on 100 parts by weight of polypropylene.

The objects of the invention described above is accomplished by a hollow fiber membrane type artificial lung, characterized by using as a gas-exchange membrane a porous polypropylene hollow fiber membrane of a circular cross section 150 to 300 $\mu$m in inside diameter and 10 to 150 $\mu$m in wall thickness, which hollow fiber membrane has an inner surface aperature ratio in the range of 10 to 30%, a porosity in the range of 10 to 60%, an oxygen gas flux in the range of 100 to 1,000 liters/min.$m^2$.atm., and inducing no leakage of blood plasma within 20 hours' use in the external circulation of blood therethrough.

This invention also discloses a hollow fiber membrane type artificial lung using a hollow fiber membrane, wherein the solid phase on the inner surface of the hollow fiber has particular polypropylene intimately fused tightly after the pattern of a continuous phase while partly exposed on the surface, the solid phase inside the hollow fiber membrane was particulate polypropylene interlinked in the axial direction of fiber to form a multiplicity of polypropylene masses mutually bound with fibers of polypropylene, and the solid phase on the outer surface of the hollow fiber membrane has threads of polypropylene containing particulate polypropylene reticularly bound coarsely, the interstices between these solid phases communicate with one another after the pattern of a three-dimensional network to give rise to continuous holes, the average particle diameter of the particulate polypropylene is in the range of 0.1 to 1.0 $\mu$m. the average pore diameter on the inner surface is in the range of 0.1 to 1.0 $\mu$m, the maximum value of the pore diameter distribution curve of the whole membrane is in the range of 0.02 to 0.2 $\mu$m, and the specific surface area is in the range of 10 to 40 $m^2/g$. This invention further discloses a hollow fiber membrane type artificial lung, wherein the hollow fiber membrane used therein has an oxygen permeation coefficient in the range of 140 to 1,400 liters/min.$m^2$.atm. and an ultimate amount of oxygen permeated in the range of 200 to 2,000 liters/min.$m^2$.atm.

BRIEF DESCRIPTION OF THE DRAWINGS

FIG. 1 is a cross section illustrating with a model the fine structure of a hollow fiber membrane of this invention, FIG. 2 is a schematic cross section of an apparatus used in the method of this invention for the manufacture of a hollow fiber membrane.

PREFERRED EMBODIMENT OF THE INVENTION

Figure 4:
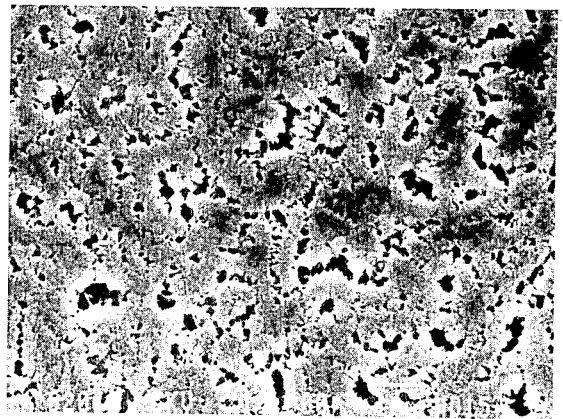
Figure 5:
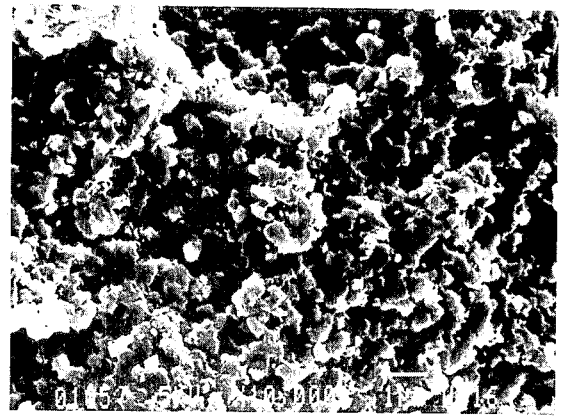
Figure 6:
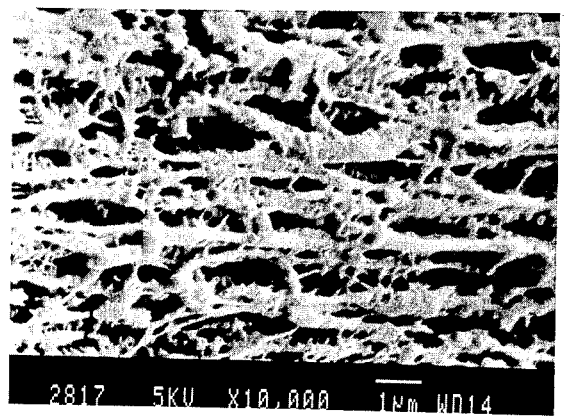
Figure 7:
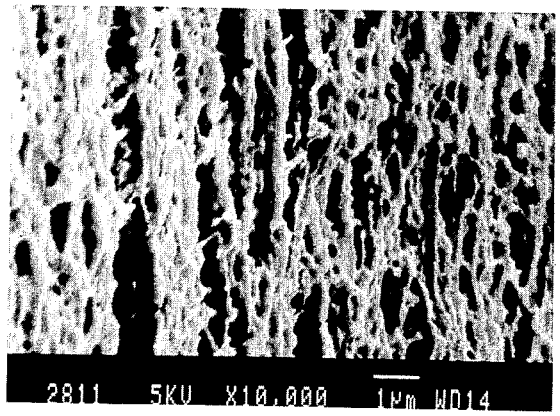
Figure 8:
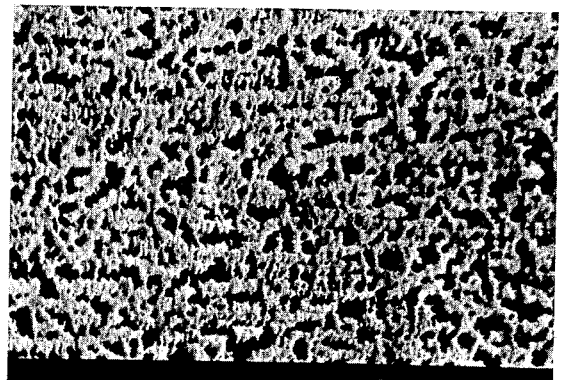
Figure 9:
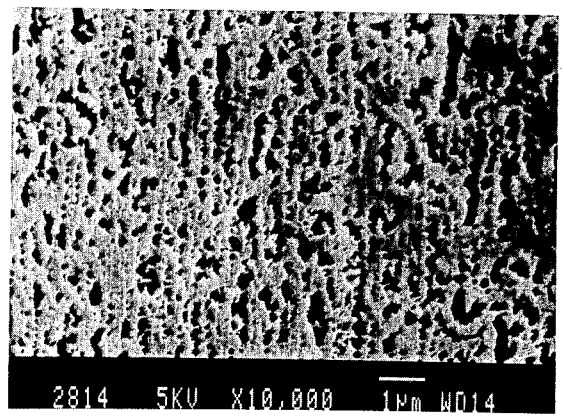
Figure 10:
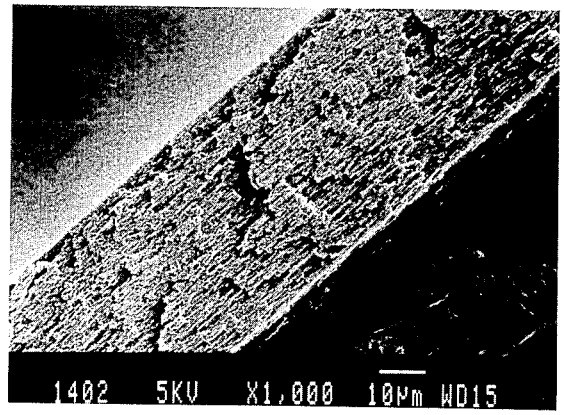
Figure 11:
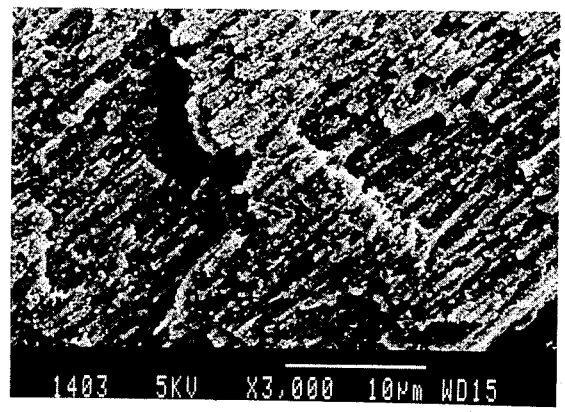
Figure 12:
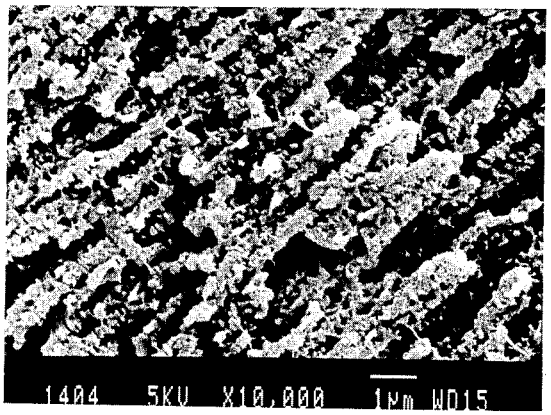
Figure 13:
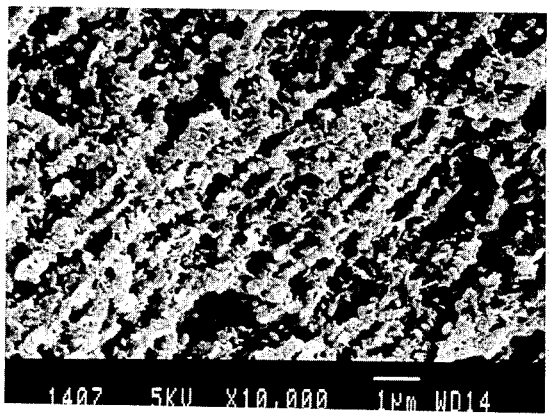

Now, the present invention will be described specifically below with reference to the accompanying drawings. FIG. 1 is a diagram portraying a cross section of a hollow fiber membrane of the present invention in the form of a model. As noted from this diagram, this is a hollow fiber membrane 1 made of polypropylene in a circular, preferably a substantially true circular cross section and having an inside D, in the range of 150 to 300 $\mu$m, preferably 180 to 250 $\mu$m, and a wall thickness, T, in the range of 10 to 150 $\mu$m, desirably 20 to 100 $\mu$m, and more desirably 40 to 60 $\mu$m. The fine structure of his hollow fiber membrane of polypropylene is variable with the conditions imposed on the manufacture of the hollow fiber membrane. Generally, this hollow fiber membrane acquires the fine structure shown in the scanning electron microscope photographs of FIGS. 3–13 when a compound identical with or similar to the organic filler incorporated in the raw materials for the hollow fiber is used as the cooling and solidifying agent as described fully afterward. To be specific, on the inner surface 2 side of the hollow fiber membrane, the solid phase has particulate polypropylene intimately fused tightly (i.e., after fusing, solidifying by cooling) after the pattern of a continuous phase while partly exposed on the surface [see FIG. 4, FIG. 8, and FIG. 9] and, on the outer surface 3 side, the solid phase has fibers of polypropylene containing particulate polypropylene reticularly bound coarsely [see FIG. 3, FIG. 6, and FIG. 7]. Inside the membrane, the solid phase is made up of numerous polypropylene particles. These polypropylene particles irregularly gather without any directionality in the circumferential direction (see FIG. 5). In the axial direction of fiber, they are interlinked to form polypropylene masses and these polypropylene masses are mutually bound with threads of polypropylene [see FIG. 10, FIG. 11, FIG. 12, and FIG. 13]. It is inferred, therefore, that inside the membrane, the solid phase has particulate polypropylene interlocked in the axial direction of fiber to give rise to a multiplicity of polypropylene masses and these polypropylene masses mutually bound with threads of polypropylene.

The interstices between these solid phases form communicating holes not in a straight line mutually connected intricately and reticularly and distributed after the pattern of a three-dimensional network, with long paths extending from the inner surface 2 to the outer surface 3 in the thick wall part 4 of the hollow fiber membrane 1 including the inner surface 2 and the outer surface 3.

The holes in the inner surface 2 have an average pore diameter of about 0.1 to 1.0 $\mu$m, preferably about 0.3 to 0.6 $\mu$m. The aperture ratio in the inner surface is in the range of 10 to 30%, preferably 12 to 20%. The porosity of the whole hollow fiber membrane is in the range of 10 to 60%, preferably 30 to 55%. The oxygen gas flux is in the range of 100 to 1,000 liters/min.m$^2$.atm., preferably 300 to 600 liters/min.m$^2$.atm. The hollow fiber of the present invention is such that when the hollow fiber membrane is used for external circulation of blood, it will induce no leakage of blood plasma within 20 hours external circulation of the blood. The size and distribution of fine polypropylene particles making up the hollow fiber membrane and of the communicating holes separating such fine particles can be regulated in desirable conditions by proper selection of conditions of manufacture of the hollow fiber membrane and the composition of raw materials used therefor. When the regulation is proper, there can be obtained a hollow fiber membrane wherein the average particle diameter of polypropylene particles is in the range of 0.1 to 1.0 $\mu$m, preferably 0.3 to 0.5 $\mu$m, the average pore diameter in the inner surface is in the range of 0.1 to 1.0 $\mu$m, preferably 0.3 to 0.6 $\mu$m, the maximum value of the pore diameter distribution curve of the whole membrane is in the range of 0.02 to 0.2 $\mu$m, and the specific surface area is in the range of 10 to 40 m$^2$/g, preferably 25–35 m$^2$/g. In the hollow fiber membrane of the foregoing description, the oxygen permeation coefficient is in the range of 140 to 1,400 liters/min.m$^2$.atm., preferably 400 to 900 liters/min.m$^2$.atm. and the ultimate amount of oxygen permeated is in the range of 200 to 2,000 liters/min.m$^2$.atm., preferably 600 to 1,200 liters/min.m$^2$.atm.

The hollow fiber membrane of the description given above is manufactured by the following procedure, for example. As illustrated in FIG. 2, a composition 11 made up of polypropylene, an organic filler, and a crystal seed forming agent is supplied via a hopper 12 to a kneader such as, for example, a single screw extruder 13 to be melted and mixed therein and then extruded therethrough and the extruded molten mixture is forwarded to a spinning device 14 to be discharged through an annular spinning nozzle (not shown) of a spinneret 15 into a gaseous atmosphere such as, for example, the air. The hollow thread 16 emanating from the spinneret 15 is introduced into a cooling tank 18 holding therein a cooling and solidifying liquid 17 to be cooled and solidified by contact with the cooling and solidifying liquid 17. In this case, the contact between the hollow thread 16 and the cooling and solidifying liquid 17 is desired to be made as illustrated in FIG. 2, for example, by allowing the cooling and solidifying liquid 17 to flow down the interior of a cooling and solidifying liquid blow tube 19 laid through the bottom of the cooling tank 18 and extended downwardly and causing the hollow fiber 16 to fall down along the flow of the liquid 17 and come into parallel flow contact. The cooling and solidifying liquid 17 so falling down the flow tube 19 is received and stored in a solidifying tank 20. The hollow fiber 16 is introduced into the solidifying tank 20 and then deflected therein by a deflecting bar 21 to be solidified by ample contact with the cooling and solidifying liquid 17. As the cooling and solidifying liquid 17 is accumulated, any excess thereof is discharged from the tank 20 via circulation line 23 and circulated by a circulation pump 24 to the cooling tank 18. Then, the solidified hollow fiber 16 is led into an extraction tank 27 holding therein an extractant 25 capable of dissolving the organic filler and incapable of dissolving polypropylene. When this extractant 25 happens to be a halogenated hydrocarbon possessing high volatility and lacking affinity for water, for example, an upper layer 26 such as of water may be formed for the purpose of precluding vaporization of the extractant. The hollow fiber which is led out of the extraction tank 27 by a drive roll 22 is forwarded through the steps of re-extraction and heat treatment for drying, when necessary, before it is taken up.

The polypropylene to be used as one of the raw materials in this invention is not limited to propylene homopolymer. A block polymer using propylene as a main component and other monomer can be used, for example. The polypropylene is desired to have a melt index (M.I.) in the range of 5 to 70, preferably 10 to 40. Among the types of polypropylene described above as usable, propylene homopolymer proves particularly desirable. Among the various grades of propylene homopolymer, that which has high crystallinity proves most desirable.

The organic filler is required to be of such nature that it will uniformly disperse in the polypropylene in a fused state and readily dissolves in the extractant as described fully afterward. Examples of the filler fitting this requirement are liquid paraffin (number average molecular weight 100 to 2,000), $\alpha$-olefin oligomers [such as, for example, ethylene oligomer (number average molecular weight 100 to 2,000), propylene oligomer (number average molecular weight 100 to 2,000), and ethylene-propylene oligomer (number average molecular weight 100 to 2,000)], paraffin wax (number average molecular weight 200 to 2,500), and various other hydrocarbons. Among other fillers cited above, the liquid paraffin proves to be particularly desirable.

The mixing ratio of the organic filler to polypropylene is such that the amount of the organic filler falls in the range of 35 to 170 parts by weight, preferably 80 to 150 parts by weight, based on 100 parts by weight of polypropylene. If the amount of the organic filler is less than 35 parts by weight, the produced hollow fiber membrane fails to acquire an ample ability to permit permeation of gas because part of the membrane is formed solely of a continuous phase of polypropylene. If this amount exceeds 170 parts by weight, the composition perpared for fabrication of the follow fiber membrane has too low viscosity to ensure fabrication of the hollow fiber during the course of manufacture. The composition of the mixture of raw materials is prepared by the premixing method which comprises melting and kneading a mixture of raw materials in a prescribed composition by the use of an extrduer such as, for example, a twin screw type extruder, extruding the resulting blend, and pelletizing the extruded blend.

The crystal seed forming agent to be included among the raw materials of the present invention is an organic heat-resistant substance having a melting point of not lower than 150° C. (preferably falling in the range of 200° to 250° C.) and a gel point exceeding the temperature at which the polypropylene to be used begins to crystallize. The reason for the incorporation of a crystal seed forming agent of this description is that this agent will contract polypropylene particles, consequently narrow the interstices between the particles or the communicating pores, and heighten the pore density. As concrete examples of crystal seed forming agent, 1.3, 2.4-dibenzylidene sorbitol, 1.3, 2.4-bis(p-methylbenzyldidene)sorbitol, 1.3, 2.4-bis(p-ethylbenzylidene)sorbitol, 1.3, 2.4-bis(p-ethylbenzylidene)sorbitol, bis(4-t-butylphenyl)sodium phosphate, sodium benzoate, adipic acid, talc, and kaoline can be cited.

Among the crystal seed forming agents cited above, benzylidene sorbitols and particularly 1.3, 2.4-bis(p-ethylbenzylidene)sorbitol and 1.3, 2.4-bis(p-methylbenzylidene)sorbitol prove particularly desirable because they dissolve less into the blood than other agents.

The mixing ratio of the crystal seed forming agent to polypropylene is desired to be such that the amount of the crystal seed forming agent falls in the range of 0.1 to 5 parts by weight, preferably 0.2 to 1.0 part by weight, based on 100 parts by weight of polypropylene.

The composition of raw materials prepared as described above is melted and kneaded with an extruder such as a single screw extruder at a temperature in the range of 160° to 250° C., preferably 180° to 220° C. and the resulting molten mixture is discharged through an annular nozzle of a spinning device, when necessary by the use of a gear pump of a high metering ability, to obtain a hollow fiber. To the central part inside the annular nozzle, an inert gas such as nitrogen, carbon dioxide gas, helium, argon, or air is spontaneously suctioned or forcibly introduced. Then, the hollow fiber discharged through the annular nozzle is allowed to fall down and brought into contact with the cooling and solidifying liquid held inside the cooling tank. The distance of this fall of the hollow fiber is desired to fall in the range of 5 to 1,000 mm, preferably 10 to 500 mm. If the distance of fall is less than 5 mm, there is a possibility that the hollow thread will pulsate and will be crushed on entering the cooling and solidifying liquid. In the cooling tank, the hollow fiber is not yet solidified sufficiently and the interior thereof is formed of a gas and, therefore, is liable to be deformed by the external force. By allowing the solidifying liquid 17 to flow down the interior of the cooling and solidifying liquid flow tube 19 disposed through the bottom of the cooling tank 18 and extended downwardly as illustrated in FIG. 2 and causing the hollow fiber to fall along the flow of the solidifying liquid 17 and come into parallel flow contact therewith, the hollow fiber can be forcibly moved and, at the time, prevented from the deformation by the external force (such as the pressure of fluid). For the purpose of this flow of the cooling and solidifying liquid, the speed of spontaneous downflow suffices. The cooling temperature at this time is desired to be in the range of 10° to 90° C., preferably 20° to 75° C. If this temperature is lower than 10° C., the cooling and solidifying speed is excessively high and the greater part of the wall thickness of the hollow fiber membrane inevitably becomes a tightly packed layer and the hollow fiber membrane possesses an insufficient gas-exchange capacity. If the temperature exceeds 90° C., there is a possibility that the hollow thread will not be sufficiently cooled and solidified and will lose its continuity in the cooled and solidified layer.

In the present invention, a compound identical with or similar to the organic filler is used as the cooling and solidifying liquid. The term "similar compound" means that the compound possesses chemical and physical properties substantially equalling those of the organic filler. When liquid paraffin having a number average molecular weight of 324 is used as the organic filler, for example, liquid paraffin having a number average molecular weight of 324, liquid paraffin having a number average molecular weight of 299, liquid paraffin having a number average molecular weight of 420, and $\alpha$-olefin oligomer [such as, for example, ethylene oligomer having a number average molecular weight of 100 to 2,000, propylene oligomer having a number average molecular weight of 100 to 2,000], or ethylene-propylene oligomer having a number average molecular weight of 100 to 2,000, or paraffin wax having a number average molecular weight of 200 to 2,500 may be used as the cooling and solidifying liquid. It is for the following reason that the compound identical with or similar to the organic filler is used as the cooling and solidifying liquid. When a liquid capable of dissolving the organic filler is used as the cooling and solidifying liquid, e.g. when a halogenated hydrocarbon is used where liquid paraffin is used as the organic filler, the organic filler is completely dissolved and extracted while the phase separation of the organic filler from polypropylene is proceeding in the cooling and solidifying liquid, with the possible result that the proportion of the organic filler near the inner surface of the hollow fiber is lowered, the aperture ratio in the inner surface is lowered after more thorough dissolution and extraction of the organic filler, and the gas-exchange capacity of the membrane is lowered by the time the organic filler completely migrates from the interior to the exterior of the hollow fiber and the hollow fiber is thoroughly cooled and solidified. Moreover, in this case, there is a possibility that even the low molecular component of polypropylene in the hollow fiber will be additionally extracted, deposited on the inner wall of the cooling and solidifying liquid flow tube 19 shown in FIG. 2, and consequently suffered to decrease the inside diameter of the cooling and solidifying liquid flow tube 19 and change the shape of the hollow fiber. When an inactive liquid incompatible with the organic filler is used as the cooling and solidifying liquid, e.g. when water is used as the cooling and solidifying liquid where liquid paraffin is used as the organic filler, there is a possibility that the outer surface will assume a state of low crystallinity because water has large specific heat and possesses a high cooling effect enought to cool polypropylene suddenly. As the result, polypropylene fails to form fine particles. When water is used as the cooling and solidifying liquid, therefore, there is a possibility that the produced hollow fiber membrane will form excessively small pores in the outer surface and will consequently have an insufficient gas-exchange capacity. Incidentally, the hollow fiber has its shape determined by the flow of the cooling and solidifying liquid prevailing when the hollow fiber is introduced into the cooling and solidifying liquid. In the present case using water as the cooling and solidifying liquid, there is entailed an extra disadvantage that since the viscosity of the cooling and solidifying liquid cannot be regulated at a high level, the shape of the hollow fiber is not easily fixed and, consequently, the hollow fiber is suffered to pulsate.

When a compound identical with or similar to the organic filler is used as the cooling and solidifying liquid, e.g. when liquid paraffin is used as the organic filler and separate liquid paraffin having a number average molecular weight approximating that of the former liquid paraffin is used as the cooling and solidifying liquid, the organic filler (liquid paraffin) in the hollow fiber does not appreciably migrate within the hollow fiber and avoids preventing the hollow thread from acquiring a prescribed pore density. Furthermore the organic filler does not have the large specific heat of water and thus effectively cools polypropylene at a proper speed to promote crystallization of polypropylene and enable the hollow fiber to acquire a stable shape without any possibility of incidentally extracting even the low molecular component of polypropylene. Moreover, when the liquid paraffin to be adopted has a proper molecular weight, it is enabled to acquire just right viscosity at a desirable temperature and, consequently, the hollow fiber is allowed easily to take shape extactly as desired.

The hollow fiber which has been thoroughly cooled and solidified in the cooling and solidifying tank is directed by the deflection bar to the extraction tank, where the organic filler is removed by dissolution and extraction. The means of dissolving and extracting the organic filler is not limited to the method resorting to the extraction tank shown in FIG. 2. Instead, the shower method which comprises advancing the hollow fiber on a belt conveyor and showering the hollow fiber in motion with an extractant, the rewinding method which comprises taking up the hollow fiber on a reel and, when the hollow fiber is rewound on a separate reel, immersing the separate reel in an extractant, or any of the other methods which are capable of establishing intimate contact between the hollow fiber and an extractant can be adopted. Optionally, two or more of such methods may be used in combination.

As the extractant, any substance can be used so long as it is incapable of dissolving polypropylene as the main component of the hollow fiber membrane and capable of dissolving the organic filler. As typical examples, there can be cited alcohols such as methanol, ethanol, propanols, butanols, pentanols, hexanols, octanols, and lauryl alcohol and halogenated hydrocarbons such as 1,1,2-trichloro-1,2,2-trifluoroethane, trichlorofluoromethane, dichlorofluoromethane, and 1,1,2,2-tetrachloro-1,2-difluoroethane. Among the extractants enumerated above, the halogenated hydrocarbons prove particularly desirable from the standpoint of ability to extract the organic filler. Especially, chlorofluorohydrocarbons prove advantageous from the standpoint of safety of human body.

The hollow fiber membrane which is obtained as described above is subjected, when necessary, to a heat treatment. This heat treatment is carried out in the atmosphere of such gas as air, nitrogen, or carbon dioxide at a temperature in the range of 50° to 160° C., preferably 70° to 120° C., for a period in the range of 5 seconds to 120 minutes, preferably 10 seconds to 60 minutes. This heat treatment serves to stabilize the structure of the hollow fiber membrane and enhance the dimensional stability thereof. Further in this case, the hollow fiber membrane may be stretched either prior to or during the heat treatment.

The hollow fiber membrane obtained as described above is optimally used in a hollow fiber membrane type artificial lung.

The hollow fiber membrane obtained by the conventional stretching method has exhibited excessively high permeability to gas for the purpose of its use in an artificial lung. When blood is circulated inside the hollow fiber, the ability of the hollow fiber membrane to add oxygen to the blood is obstructed by heavy resistance offered by the membrane boundary on the blood side and the resistance of the hollow fiber membrane is not offered at a fixed rate. On the other hand, while the ability of the hollow fiber, membrane to remove carbon dioxide gas from the blood depends on the resistance offered, the permeability of the hollow fiber membrane to this gas is excessive. When the blood is circulated outside the hollow fiber, while the ability of the hollow fiber to exchange gas depends likewise on the resistance offered by the hollow fiber membrane, the permeability of the membrane to the gas is excessive as well.

The hollow fiber membrane of this invention manifests a sufficient performance so long as it is used as incorporated in an artificial lung, whereas the membrane in itself has lower permeability to gas than the hollow fiber membrane produced by the conventional stretching method. Moreover, since the hollow fiber membrane of this invention is produced by the extraction method, it is prevented from sustaining pinholes which are responsible for leakage of blood and consequently for degradation of gas-exchange ability.

Figure 23:
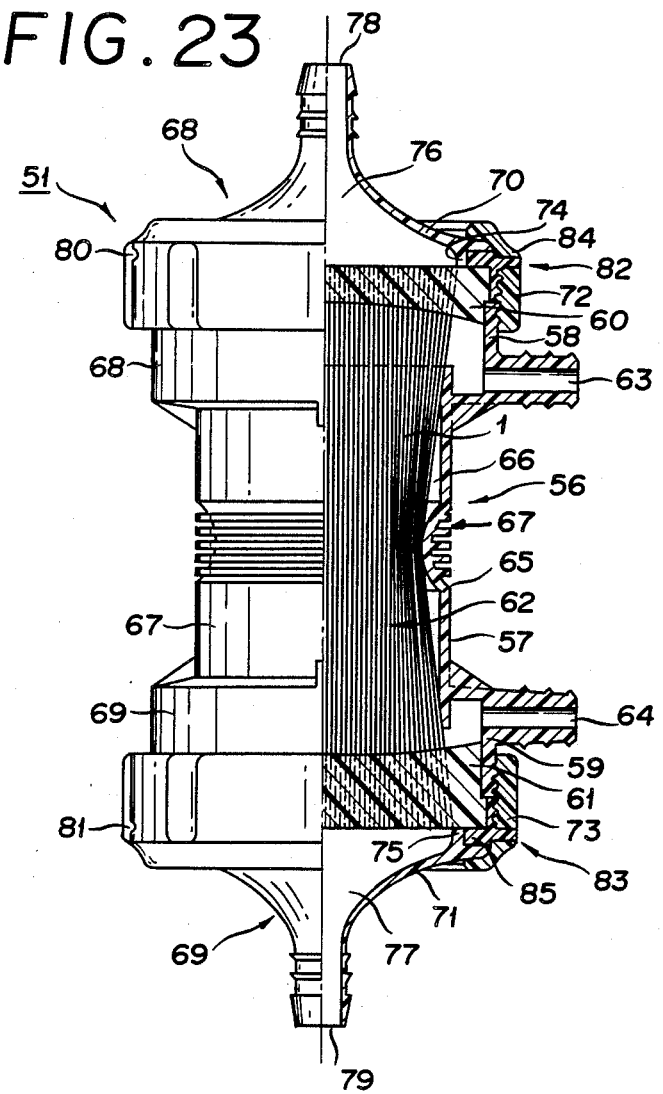
FIG. 23 is a half-sectioned view illustrating a typical hollow fiber membrane type artificial lung as one embodiment of the present invention.

FIG. 23 illustrates a typical hollow fiber membrane type artificial lung as on embodiment of this invention in an assembled state. As illustrated, the hollow fiber membrane type artificial lung 51 is posessed of a housing 56. This housing 56 is provided at the opposite ends of a cylindrical main body 57 thereof with annular fitting covers 58, 59 each containing a male screw. Inside this housing 56, numerous, specifically 10,000 to 60,000, hollow fiber membranes 1 produced by the method described above are disposed parallelly in the longitudinally direction of the housing 56 as separated one from another. The opposite ends of these hollow fiber membranes 1 are water-tightly suported in position by walls 60, 61 in such a state that their individual openings are left open. The aforementioned walls 60, 61, in conjunction with the outer peripheries of the hollow fiber membranes 1 and the inner surface of the housing 56, define and oxygen chamber 62 which serves as a first substance transfer chamber. They serve the purpose of closing the first substance transfer chamber and, at the same time, isolate from the the oxygen chamber 62 a space for blood flow (not shown) which is a space for a second substance transfer fluid to be formed inside the hollow fiber membranes 1.

The fitting cover 58, one of the pair mentioned above, is provided with an inlet 63 for admitting oxygen which is the first substance transfer fluid. The other fitting cover is provided with an outlet 64 for discharge of oxygen.

The cylindrical main body 57 of the housing is desired to be provided in the inner side thereof at the center in the axial direction with a projecting constriction 65. To be specific, this constriction 65 is integrally formed with the cylindrical main body 57 on the inner surface thereof in such a manner as to constrict the overall periphery of a hollow fiber bundle 66 consisting of the multiplicity of hollow fiber membranes 1 inserted in the cylindrical main body 57. In this arrangement, the aforementioned hollow fiber bundle 66 is constricted at the center in the axial direction to form a constricted part 67 as illustrated in FIG. 23. The packing ratio of the hollow fiber membranes 1, therefore, varies at different points along the axial direction and reaches its maximum at the center. For the reason to be described fully afterward, desirable packing ratios at different parts are as shown below. First, the packing ratio at the constriction 67 at the center is about 60 to 80% and that elsewhere inside the cylindrical main body 57 is about 30 to 60%. The packing ratio at the opposite ends of the hollow fiber bundle 66, namely on the outer surfaces of the walls 60, 61 is about 20 to 40%.

Now, the formation of the walls 60, 61 will be described below. As already pointed out, the walls 60, 61 serve to fulfil an important function of isolating the interiors of the hollow fiber membranes 2 from their exteriors. Generally, the walls 60, 61 is produced by causing a macromolecular potting material of high polarity such as, for example, polyurethane, silicone, or epoxy resin to flow into the inner wall surfaces at the opposite ends by the centrifugal injection method and allowing the deposited potting material to cure. To be more specific, a multiplicity of hollow fiber membranes 1 of a greater length than the housing 56 are prepared and, with their opposite open ends filled with highly viscous resin, disposed parallelly inside the cylindrical main body 57 of the housing 56. Then, the opposite ends of the hollow fiber membranes 1 are completely covered with die covers of a diameter larger than that of the fitting covers 58, 59. The housing 56 is rotated about the axis of the housing 56 and the macromolecular potting material is caused to flow in through the opposite sides thereof. After the resin has filled the spaces an has been cured, the die covers are removed and the outer surfaces of the cured resin discs with a sharp blade to expose the opposite openings of the hollow fiber membranes 1 on the surfaces. Thus, the walls 60, 61 are formed.

The outer surfaces of the walls 60, 61 are covered repectively with flow path forming members 68, 69 each provided with an annular protuberance. These flow path forming members 68, 69 are composed respectively of liquid distributing members 70, 71 and threaded rings 72, 73. The raised strips 74, 75 disposed in the form of annular projections near the peripheries of the liquid distributing members 70, 71 are allowed to collide with the walls and the threaded rings 72, 73 are helically fastened to the fitting covers 58, 59, to give birth to an inflow chamber 76 and an outflow chamber 77 both for blood as the second substance transfer fluid. In the flow path forming members 68, 69, there are respectively formed an inlet 78 and an outlet 79 for the blood as the second substance transfer fluid.

The empty spaces formed along the peripheries of the walls 60, 61 by the walls 60, 61 and the flow path forming members 68, 69 are sealed as though they were held in contact with the walls 60, 61 when they are filled with the packing agents 84, 85 introduced via either of at least two holes 82, 83 communicating with the empty spaces. Otherwise, these empty spaces may be sealed with O rings (not shown).

In the hollow fiber membrane type artificial lung, the first substance transfer fluid is an oxygen-containing gas such as air or blood and the second substance transfer fluid is blood or an oxygen-containing gas. When the first substance transfer fluid is a gas, the second substance transfer fluid is blood. In contrast, when the first substance transfer fluid is blood, then the second substance transfer fluid is a gas.

Now, the present invention will be described more specifically below with reference to working examples.

EXAMPLES 1-10 AND CONTROLS 1-8

In a twin-screw extruder (made by Ikegai Iron Works, Ltd. and marketed under trademark designation of "PCM-30-25"), 100 parts by weight of propylene homopolymer of melt index (M.I.) of 23 admixed with a varying proportion of liquid paraffin (having a number average molecular weight of 324) indicated in Table 1 and 0.5 part by weight of 1.3,2.4-bis(p-ethylbenzylidene)sorbitol was melted and kneaded, and extruded. The extruded mixture was pelletized. The pellets were melted in an apparatus illustrated in FIG. 2, namely a single-screw extruder (made by Kasamatsu Seisakusho and marketed under trade designation of "WO-30"), at a varying temperature indicated in Table 1. The molten mixture was discharged in a varying amount indicated in Table 1 into the air through an annular spinning nozzle 15 having a core diameter of 4 mm, an inside diameter of 6 mm, an outside diameter of 7 mm, and a land length of 15 mm. The hollow fiber 16 emanating from the spinning nozzle 15 was left falling. The distance of fall was as shown in Table 1. Then, the hollow fiber 16 was brought into contact with a varying cooling and solidifying liquid 17 indicated in Table 1 held in a cooling tank 18 and subsequently allowed to come into parallel flow contact with the cooling and solidifying liquid 17 which was spontaneously flowing down the interior of a cooling and solidifying liquid flow tube 19. The temperature of the cooling and solidifying liquid at this point was as shown in Table 1. The hollow fiber 16 was then introduced into the cooling and solidifying liquid held in the solidifying tank 20, deflected by a deflection bar 21, introduced into 1,1,2-trichloro-1,2,2-trifluoroethane (hereinafter referred to as "Freon 113") held in an extraction tank 27. It was then deflected by the deflection bar 21, led to a drive roll 22 rotated at a varying winding speed indicated in Table 1 and, in a shower-conveyor type extracting machine 29, completely deprived of the liquid paraffin with Freon 113. The hollow fiber was forwarded through a dirve roll 22, passed through a heat treating device 32 kept under varying temperature and time conditions indicated in Table 1, and taken up on a bobbin 34 by the use of a winder 33. The hollow fiber taken up on the bobbin 34 was rewound on a reel with a rewinding device, to afford a bundle of hollow fibers about 30 cm in length. The hollow fiber membrane thus obtained was tested for shape (wall thickness), average particle diameter of polypropylene, average pore diameter in inner surface, porosity, pore diameter distribution curve, aperture ratio of inner surface, oxygen gas flux, ability to add oxygen gas, ability to remove carbon dioxide gas, oxygen permeation coefficient, ultimate amount of oxygen permeated, specific surface area, and leakage of blood plasma. The results obtained are shown in Table 1.

Figure 3:
FIGS. 3–13 are scanning electron microscope photographs showing the textures of hollow fiber membranes manufactured in accordance with the present invention.
Figure 14:
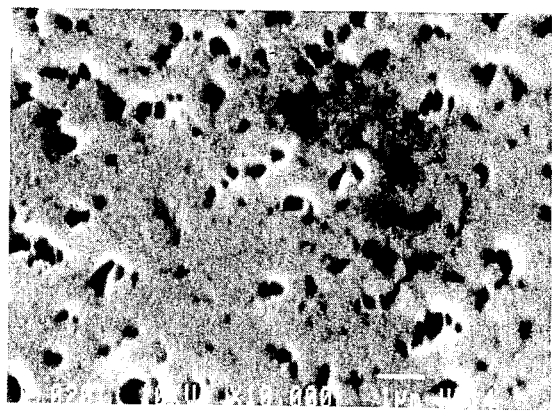
FIGS. 14–22 are scanning electron microscope photographs showing the textures of conventional hollow fiber membranes.
Figure 15:
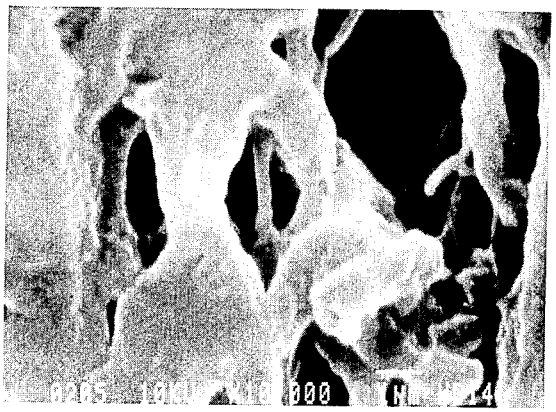

To test the hollow fiber membrane for fine structure, various positions of hollow fiber membranes were observed under a scanning electron microscope (made by JEOL and marketed under trademark designation of "JSM-840"). FIG. 3 is a scanning electron microscope photograph ($\times 10,000$) of the outer surface of the hollow fiber membrane of Example 7, FIG. 4 that ($\times 10,000$) of the inner surface of the hollow fiber membrane of Example 7, FIG. 5 that ($\times 10,000$) of the cross section of the hollow fiber membrane of Example 7, FIG. 6 that ($\times 10,000$) of the outer surface as viewed obliquely relatively to the axis of the fiber of the hollow fiber membrane of Example 7, FIG. 7 that ($\times 10,000$) of the outer surface as viewed obliquely relative to the direction of circumference of the hollow fiber membrane of Example 7, FIG. 8 that ($\times 10,000$) of the inner surface as viewed obliquely relative to the axis of fiber of the hollow fiber membrane of Example 7, FIG. 9 that ($\times 10,000$) of the inner surface as viewed obliquely relative to the direction of circumference of the hollow fiber membrane of FIG. 7, FIGS. 10-13 those ($\times 1,000$ in FIG. 10, $\times 3,000$ in FIG. 11, and $\times 10,000$ in FIGS. 12-13) of the cross section of the hollow fiber membrane of FIG. 7, FIG. 14 that ($\times 10,000$) of the inner surface of the hollow fiber member of Control 7, and FIG. 15 that ($\times 10,000$) of the outer surface of the hollow fiber membrane of Control 7.

CONTROL 9

Figure 16:
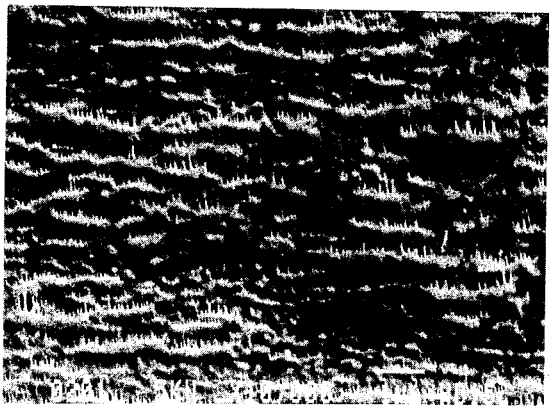
Figure 17:
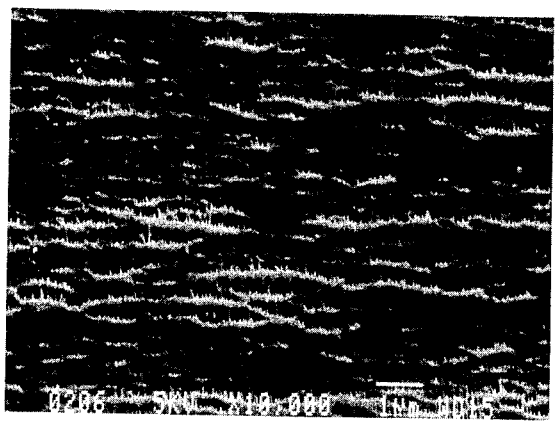
Figure 18:
Figure 19:
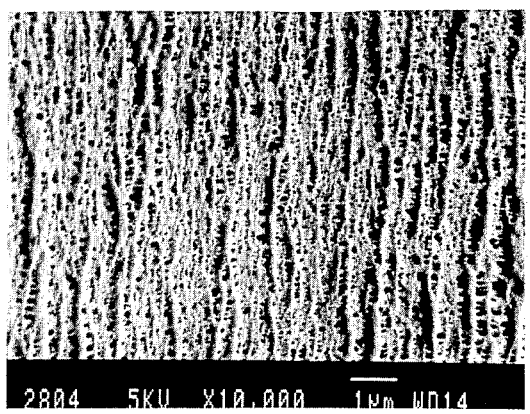
Figure 20:
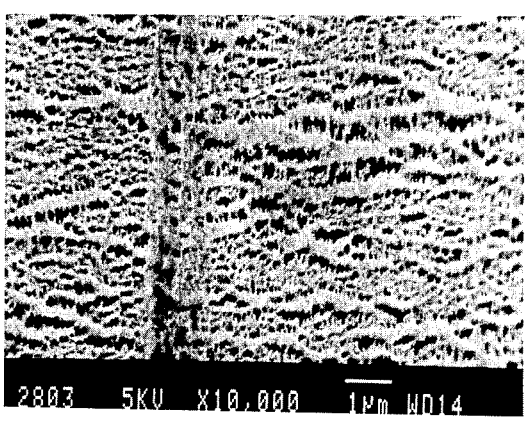
Figure 21:
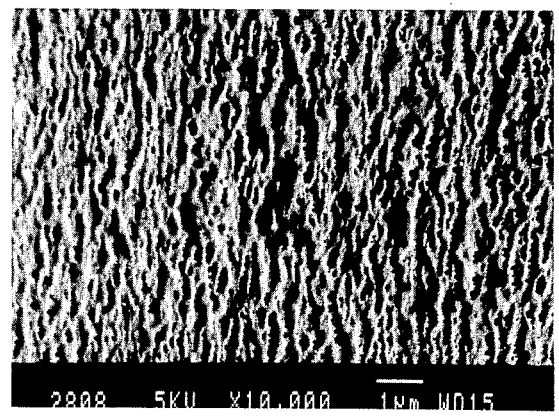
Figure 22:
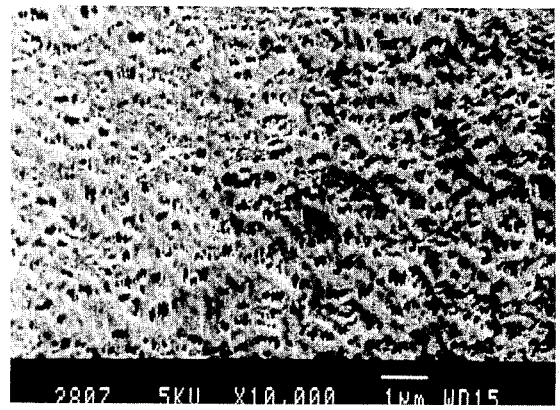

For comparison, a commercially available artificial lung grade hollow fiber membrane of polypropylene made by the conventional stretching method was tested for shape (inside diameter/wall thickness), porosity, pore diameter distribution curve, aperture ratio in inner surface, oxygen gas flux, ability to add oxygen gas, ability to remove carbon dioxide gas, oxygen permeation coefficient, ultimate amount of oxygen permeated, specific surface area, and leakage of blood plasma similarly to Examples 1-10 and controls 1-7. The results are shown in Table 1. To test the hollow fiber membrane for fine structure, various positions of this hollow fiber membrane were observed under a scanning electron microscope (made by JEOL and marketed under trademark designation of "JSM-840"). FIG. 16 is a scanning electron microscope photograph ($\times 10,000$) of the outer surface of the hollow fiber membrane, FIG. 17 that ($\times 10,000$) of the inner surface of the hollow fiber membrane, FIG. 18 that ($\times 10,000$) of the cross section of the hollow fiber membrane, FIG. 19 that ($\times 10,000$) of the outer surface as viewed obliquely relative to the axial direction of fiber of the hollow fiber membrane, FIG. 20 that ($\times 10,000$) of the outer surface as viewed obliquely relative to the circumferential direction of the hollow fiber membrane, FIG. 21 that ($\times 10,000$) of the inner surface as viewed obliquely relative to the axis of fiber of the hollow fiber membrane, and FIG. 22 that ($\times 10,000$) of the inner surface as viewed obliquely relative to the circumferential direction of the hollow fiber membrane.

EXAMPLE 11 AND CONTROL 10

The hollow fiber membranes of Example 7 and Control 9 were tested for capillarity of the pores. One end of a sample hollow fiber membrane was closed by being roasted with open fire. In a petri dish holding therein a solution of ink in ethanol to a height of 2 mm, the sample was set up substantially upright with the closed end thereof immersed to a depth of 2 mm in the solution and left standing at rest for 5 minutes. At the end of the standing, the hollow fiber was pulled up vertically and the distances of rise of the ink in the pores of membrane by capillarity were measured. The results are shown in Table 2. The numerical values shown in Table 2 each represent the average of the values obtained of ten hollow fiber membranes.

The technical terms used in the working examples and controls are defined below and the methods adopted for determination of their numerical values are also shown below.

SHAPE (INSIDE DIAMETER/WALL THICKNESS)

Ten random samples from a batch of hollow fibers were chopped crosswise into tubes about 0.5 mm in length with a sharp razor blade. With a universal projector (produced by Nippon Kogaku K.K. and marketed under trademark designation of "Nikon Profile Projector V-12"), the cross sections of the tubes were projected. With a measuring instrument (product of Nippon Kogaku K.K. and marketed under trademark designation of "Nikon Digital Counter CM-6S"), the outside diameters, $d_1$, and the inside diameters, $d_2$, of the projected cross sections were measured and the wall thicknesses, t, were calculated, thus $t = d_1d - d_2$. Then, ten sets each of numerical values obtained were averaged.

AVERAGE PARTICLE DIAMETER OF POLYPROPYLENE

A sample of the produced hollow fibers was thoroughly cooled with liquid nitrogen and snapped under sharp shock. An exposed cross section or longitudinal section was photographed ($\times 10,000$) with a scanning electron microscope. The diameters of 30 random samples of particles appearing in the photograph were measured and averaged.

AVERAGE PORE DIAMETER OF INNER SURFACE

The inner surface of a sample hollow fiber membrane was photographed in the same manner as described above. The diameters of 30 random samples of the particles appearing in the photograph were measured and averaged.

PORE DIAMETER DISTRIBUTION CURVE/POROCITY (%)

A portion, about 2 g, of the produced hollow fibers were chopped crosswise into tubes not more than 5 mm with a sharp razor blade. With a mercury porosimeter (produced by Calro Elva Corp and marketed under model code of "65A"), the specimen was gradually pressed up to 1,000 kg/cm². A pore diameter distribution curve was obtained from the amounts of mercury forced in under varying levels of pressure and a porosity from the total pore volume (volume of pores of hollow fiber per unit weight).

OXYGEN GAS FLUX

A mini-module having an available length of 14 cm and a membrane area of 0.025 m² was prepared of the produced hollow fibers. One end of the mini-module was closed. Pressure of 1 atmosphere of oxygen gas was applied to the interiors of the hollow fibers. When the mini-module reached its steady state, the flow volume of oxygen gas was read on a flowmeter (produced by Kusano Rikagakukiki Seisakusho and marketed under trademark designation of "Floatometer") and reported as oxygen gas flux.

OXYGEN PERMEATION COEFFICIENT/ULTIMATE AMOUNT OF OXYGEN PERMEATED

In a porous membrane, the realtion $$1/Q = a + b1/\Delta P$$

is recognized to exist between the amount of gas permeated, Q, and the difference of pressure between membranes.

Though not in a strict sence, a value exists which corresponds to one form of permeation coefficient. This value is $1/b$. There also exists $$\lim_{\Delta p \to \infty} 1/Q = a,$$

namely the ultimate amount of permeation, Qmax. This value is $1/a$. So, with the pressure of oxygen gas increased from 0.2 kg/cm² to 1.0 kg/cm² with increments of 0.1 kg/cm² to determine the oxygen gas flux. Based on the results of this measurement, the values of $1/b$ and $1/a$ were calculated through comparison of $1/Q$ and $1/\Delta p$.

SPECIFIC SURFACE AREA

Hollow fibers were chopped crosswide into tubes not more than about 5 mm in length with a sharp razor blade. The tubes were cleaned with ethanol, vacuum dried, and tested for specific surface area by the BET method (Brunauer-Emmett-Teller Method) using liquefied nitrogen.

The adsorption of vapor to any of most adsorbents generally conforms with the BET formula:

$$v = \frac{v_m CX}{(1-X)(1-X+CX)} \quad (1)$$

wherein stands for amount of vapor adsorbed, $v_m$ for amount of vapor adsorbed in monomolecular layer, C for a constant, and $x = P/Po$, (where P stands for vapor pressure and Po for saturated vapor pressure at adsorption temperature). So, the amount of vapor adsorbed vs. the vapor pressure was measured by means of a vacuum line (at three points).

The BET formula is transformed as follow.

$$\frac{X}{v(1-X)} = \frac{1}{v_m C} + \frac{C-1}{v_m C} X \quad (2)$$

or $$\frac{X}{v(1-X)} = \frac{1}{v_m C} + \frac{1}{v_m C} \cdot \frac{1}{X} \quad (3)$$

By plotting $$\frac{X}{v(1-X)} \text{ vs. } x \text{ or } \frac{1}{v(1-X)} \text{ vs. } \frac{1}{X}$$

and finding the inclination of the line and the intersept, the amount of vapor adsorbed in a monomolecular layer and the constant are calculated. $1/v_m =$ inclination + intersept. The term $v_m$ has a physical significance of amount of vapor adsorbed in a monomolecular layer, the surfacre area can be calculated from the cross section occupied by one molecule (15 Å² in the case of nitrogen) (The error in the three-point mensuration is about $\pm 1$ m²/g.).

APERTURE RATIO OF INNER SURFACE (%)

The inner surface of a hollow fiber was photographed ($\times 3,000$) with a scanning electron microscope (produced by JEOL and marketed under trademark designation of "JSM-840"). This photograph was enlarged on a quater printing paper (about 7,500 magnifications on the printing paper). On the photograph produced on the printing paper, four straight lines were drawn each in the direction of axis of fiber and in the direction perpendicular thereto. The proportion of the sum of the lengths of pores intersected by the straight lines to the sum of the entire lengths of the straight lines was reported as the aperture ratio of the inner surface. With respect to the hollow fibers of Example 7 and Control 9, a 3-cm square of a photograph ($\times 10,000$) taken with the same scanning electron microscope was analyzed for variation of density with a graphic analyzer (made by Showa Denko K.K. and marketed under trademark designation of "Shonic GA"), to find the surface proportion of pores.

ABILITY TO ADD OXYGEN GAS AND ABILITY TO REMOVE CARBON DIOXIDE GAS

An artificial lung module having an available length of 130 mm and a membrane area of 1.6 m² was prepared of the produced hollow fibers. Bovine blood (standard veinal blood) was supplied in a single path at a flow volume of 1.6 liters/min. to the interiors of the hollow fibers and pure oxygen was supplied at a flow volume of 1.6 liters/min to the exteriors of the hollow fibers. With a blood gas measuring device (produced by Radiometer Corp. and marketed under model code of "BGA3"), the bovine blood pH's, the carbon dioxide gas partial pressures ($P_{CO_2}$), and the oxygen gas partial pressures ($P_{O_2}$) at the inlet and outlet of the artificial lung were measured, to calculate the partial pressure differences at the inlet and outlet of the artificial lung.

LEAKAGE OF BLOOD PLASMA

An artificial lung module similar to that used for the determination of ability to add oxygen gas and ability to remove carbon dioixde gas was prepared. In a partial V-A bypass formed by jugular and carotid cannulation using a mongrel dog (about 20 kg weight), this artificial lung module was incorporated and used for 30 hours external circulation of blood. The amount of blood plasma which had leaked from the interiors of the hollow fibers was measured. In the absence of any discernible leakage of blood plasma, the drops formed by condensation of steam outside the hollow fibers was tested for reaction with proteins in an effort to detect leakage of minute blood plasma.

TABLE 1

| | | Liquid paraffin content (phr) | Molding temperature (°C.) | Amount discharged (g/min) | Winding speed (g/min) | Cooling and solidifying liquid | Temperature (°C.) | Distance of fall (mm) | Heat set (°C.) | Shape (μm) Inside diameter | Shape (μm) Thickness |
|---|---|---|---|---|---|---|---|---|---|---|---|
| Example | 1 | 60 | 200 | 2.66 | 80 | Liquid paraffin | 30 | 39 | 70–80 | 203 | 43 |
| " | 2 | 70 | " | " | " | Liquid paraffin | " | 34 | " | 194 | 44 |
| " | 3 | 80 | " | " | " | Liquid paraffin | " | 30 | " | 198 | 43 |
| " | 4 | 90 | " | " | " | Liquid paraffin | " | 28 | " | 198 | 44 |
| " | 5 | 100 | " | " | " | Liquid paraffin | " | 23 | " | 198 | 45 |
| " | 6 | 110 | " | " | " | Liquid paraffin | " | 20 | " | 199 | 44 |
| " | 7 | 120 | " | " | " | Liquid paraffin | " | 18 | " | 201 | 44 |
| " | 8 | 130 | " | " | " | Liquid paraffin | " | 15 | " | 199 | 45 |
| " | 9 | 120 | 180 | 3.66 | " | Liquid paraffin | " | 19 | 100–110 | 200 | 45 |
| " | 10 | 180 | " | 3.2 | " | Liquid paraffin | " | 18 | " | 200 | 30 |
| Control | 1 | 60 | 200 | 3.33 | 100 | Freon | 30 | 44 | 70–80 | 209 | 43 |
| " | 2 | 70 | " | " | " | " | " | 40 | " | 214 | 44 |
| " | 3 | 80 | " | " | " | " | " | 36 | " | 189 | 45 |
| " | 4 | 90 | " | " | " | " | " | 33 | " | 197 | 43 |
| " | 5 | 100 | " | " | " | " | " | 30 | " | 199 | 44 |
| " | 6 | 110 | " | " | " | " | " | 28 | " | 198 | 44 |
| " | 7 | 120 | " | " | " | " | " | 25 | " | 201 | 44 |
| " | 8 | 130 | " | " | 7.6 | 170 | Water | 35 | 30 | " | 179 | 44 |
| " | 9 | — | — | — | — | — | — | — | — | 200 | 23 |

| | | Average particle diameter of Polypropylene (μm) | Average pore diameter in inner surface (μm) | Position of maximum value in pore diameter distribution curve (μm) | O₂ permeation Coefficient (lit/min · m² · atm.) | Ultimate amount of O₂ permeated (lit/min · m² · atm.) | Specific surface area (m²/g) |
|---|---|---|---|---|---|---|---|
| Example | 1 | 0.42 | 0.39 | 0.08 | 119 | 135 | 12 |
| " | 2 | 0.40 | 0.41 | 0.10 | 169 | 217 | 13 |
| " | 3 | 0.40 | 0.41 | 0.09 | 303 | 561 | 13 |
| " | 4 | 0.42 | 0.45 | 0.12 | 458 | 713 | 21 |
| " | 5 | 0.39 | 0.48 | 0.15 | 483 | 757 | 23 |
| " | 6 | 0.38 | 0.48 | 0.14 | 522 | 827 | 23 |
| " | 7 | 0.39 | 0.55 | 0.17 | 772 | 954 | 28 |
| " | 8 | 0.34 | 0.57 | 0.17 | 1069 | 1103 | 31 |
| " | 9 | 0.37 | 0.54 | 0.12 | 705 | 870 | 33 |
| " | 10 | 0.42 | 0.46 | — | — | — | — |
| Control | 1 | 2.6 | 0.07 | No clear max. value | 8.5 | 10 | 3 |
| " | 2 | 2.3 | 0.1 | " | 13 | 17 | 4 |
| " | 3 | 2.6 | 0.1 | " | 26 | 31 | 7 |
| " | 4 | 2.7 | 0.4 | " | 62 | 78 | 9 |
| " | 5 | 2.3 | 0.4 | " | 67 | 82 | 9 |
| " | 6 | 2.6 | 0.7 | " | 72 | 83 | 12 |
| " | 7 | 2.4 | 0.8 | " | 84 | 101 | 13 |
| " | 8 | — | — | — | 0 | 0 | — |
| " | 9 | — | — | 0.17 | 1605 | 3240 | 48 |

| | Aperture ratio | Porosity (b) | O₂ gas flux (lit/ | Ability to add O₂ | Ability to remove | Leakage blood |
|---|---|---|---|---|---|---|

TABLE 1-continued

|  |  | (a) (%) | (%) | min · m² · atm.) | c/a | c/b | c/a × b | (ml/min · m²) | $CO_2$ (ml/min · m²) | of plasma |
|---|---|---|---|---|---|---|---|---|---|---|
| Example | 1 | 10.0 | 32.8 | 71.6 | 7.2 | 2.2 | 0.21 | 39.2 | 39.6 | No leakage after 30 hrs. |
| " | 2 | 11.1 | 35.1 | 100.3 | 9.0 | 2.9 | 0.25 | 40.9 | 41.0 | No leakage after 30 hrs. |
| " | 3 | 13.0 | 36.0 | 174.7 | 13.4 | 4.9 | 0.38 | 42.2 | 45.5 | No leakage after 30 hrs. |
| " | 4 | 13.0 | 38.8 | 251.2 | 19.3 | 6.5 | 0.50 | 38.7 | 45.9 | No leakage after 30 hrs. |
| " | 5 | 13.2 | 39.2 | 281.0 | 21.3 | 7.2 | 0.55 | 39.1 | 47.6 | No leakage after 30 hrs. |
| " | 6 | 14.0 | 42.4 | 312.6 | 22.3 | 7.4 | 0.53 | 39.1 | 47.0 | No leakage after 30 hrs. |
| " | 7 | 18.3 | 45.1 | 456.7 | 25.0 | 10.1 | 0.55 | 42.0 | 50.1 | No leakage after 30 hrs. |
| " | 8 | 22.4 | 50.5 | 632.8 | 28.3 | 12.4 | 0.56 | 36.6 | 52.7 | No leakage after 30 hrs. |
| " | 9 | 17.6 | 38 | 416 | 23.6 | 10.9 | 0.62 | 40.9 | 47.6 | No leakage after 30 hrs. |
| " | 10 | 13.1 | 28 | 187 | 14.3 | 6.7 | 0.51 | 36.9 | 34.8 | No leakage after 30 hrs. |
| Control | 1 | 5.1 | 17.8 | 5.3 | 1.0 | 0.3 | 0.06 | 29.6 | 26.2 | Protein quasi-positive after 30 hrs. |
| " | 2 | 5.0 | 18.3 | 8.6 | 1.7 | 0.5 | 0.09 | 30.3 | 29.2 | Protein quasi-positive after 30 hrs. |
| " | 3 | 6.1 | 19.6 | 16.9 | 2.8 | 0.9 | 0.14 | 39.6 | 30.3 | Protein quasi-positive after 30 hrs. |
| " | 4 | 7.3 | 25.2 | 39.3 | 5.4 | 1.6 | 0.14 | 32.4 | 32.2 | Protein quasi-positive after 30 hrs. |
| " | 5 | 7.5 | 28.9 | 42.0 | 5.6 | 1.5 | 0.19 | 36.9 | 34.4 | Protein quasi-positive after 30 hrs. |
| " | 6 | 8.2 | 31.7 | 45.1 | 5.5 | 1.4 | 0.17 | 38.6 | 35.9 | Protein quasi-positive after 30 hrs. |
| " | 7 | 8.9 | 35.6 | 53.0 | 6.0 | 1.5 | 0.17 | 42.1 | 38.0 | Protein quasi-positive after 30 hrs. |
| " | 8 | — | — | 0 | — | — | — | — | — | — |
| " | 9 | 20.1 | 45.0 | 1200 | 59.7 | 26.6 | 1.33 | 41.8 | 49.8 | Leakage occurred after 17 hrs. Amount thereof increased after 20 hrs. |

A review of the results shown in Table 1 reveals that in the hollow fiber membranes obtained in Examples 1-8, the ratios of oxygen gas flux vs aperture ratio of inner surface fell in the range of 7:1 to 30:1. If the ratio is less than 7:1, particularly less than 6:1, the ability to remove $CO_2$ is insufficient as demonstrated in Control 7. If this ratio exceeds 30:1, protracted circulation of blood has a possibility of entailing leakage of blood plasma. From the standpoint of the ability to remove $CO_2$, the ratio is desired to exceed 13:1. In the case of the hollow fiber membranes of Examples 1-8, the ratios of oxygen gas flux vs. porosity fell in the range of 2:1 to 13:1. If this ratio is less than 2:1, the ability to remove $CO_2$ is not sufficient as demonstrated in Control 7. Further, the quotients obtained by dividing the values of oxygen gas flux by the respective values of porosity and aperature ratio invariably exceeded 0.7. In Control 9, the quotient was as large as 1.33. This quotient may well be regarded as one criterion for judgement of leakage of blood plasma. It is considered safe to judge that leakage of blood plasma is absent where the quotient is not more than 0.7.

TABLE 2

| | Distance of rise of ink (mm) |
|---|---|
| Example 11 | About 4.0 |
| Control 10 | About 1.0 max. |

EXAMPLES 12-13

Hollow fiber membranes were prepared by following the procedure of Examples 1-9, except that the spinning conditions were as shown in Table 3. Mini-modules (each consisting of 312 hollow fibers) having an available length of 140 mm and a membrane area of about $2.7 \times 10^{-2}$ m² were prepared of the produced hollow fiber membranes. These mini-modules were tested for oxygen gas flux, amount of water permeated, bubble point, and amount of blood plasma permeated. The results are shown in Table 3. Here, the oxygen gas flux was determined by the method already described, and the other physical properties were determined by the following methods.

AMOUNT OF WATER PERMEATED

A mini-module to be used for measurement is dipped into aqueous ethanol solutions each in concentrations of 100%, 90%, 70% and 50% in order each for 2 hours, and then dipped into water for 2 hours to hydrophilize. Pressurized water is poured into the hollow fiber under a undried state by a pressure tank under a pressure of 0.45 kg/cm² G, and amount of water permeated through the hollow fiber membrane is measured by a mass cylinder.

BUBBLE POINT

A hydrophilized mini-module similar to measurement of amount of water permeated is placed into water, pressurized water is poured into the hollow fiber and a pressure when bubbles occers through the hollow fiber membrane is measured.

BLOOD PLASMA PERMEATION COEFFICIENT

A hydrophilized mini-module similar to measurement of amount of water permeated is used, plasma obtained by centrifuging bovine blood is passed by a pump under a pressure of 0.45 kg/cm$^2$ and the amount thereof is measured by a mess cylinder. Permeation rate of albumin is decided by measuring albumin contents in plasma before and after permeation.

Further, the average pore radius of the hollow fiber membranes was calculated based on the amount of water permeated and the blood plasma permeation coefficient and was compared with the aforementioned average pore diameter of inner surface, the average pore radius found by means of a scanning electron microscope, and the average pore radius found by the mercury pressure injection method. The results are shown in Table 4.

CONTROLS 11-12

For the purpose of comparison, mini-modules were prepared of commercially available artificial lung grade polypropylene hollow fiber membranes by the conventional stretching method (produced by Mitsubishi Rayon Co., Ltd., and marketed under trade code of "KPF-200M") by following the procedure of Examples 12-13. They were tested for oxygen gas flux, amount of water permeated, bubble point, and amount of blood plasma permeated. The results are shown in Table 3. The numerical values of average pore radii of the hollow fiber membranes obtained by the various methods mentioned above are shown in Table 4.

those of amount of blood plasma permeated were considerably lower (about ⅓ to 1/5) in the products of the present invention than in the commercial products, possibly indicating that in the membrane structures of the products of this invention, portions of communicating holes of large diameters and portions of those of small diameters are intertwined. Such membrane structures are highly advantageous in terms of leakage of blood plasma. The bubble point is a physical property whose magnitude depends on the maximum pore diameter in the mini-module. From the results of bubble point shown above, therefore, it may be concluded that the maximum pore diameter was smaller in the products of the method of this invention than in the commercial products by the stretching method.

The differences in average pore radius among the different methods of determination are considered to arise from the following factors. First, since the average pore radius by the scanning electron microscope is an apparent pore radius in the inner surface, the values of this physical property obtained by the products of the present invention were larger than those of the commercial products. Since the average pore radius by the amount of water permeated is a magnitude which depends on the porosity, the pore density, and the average pore radius of the whole module, the values obtained of the products of the present invention were smaller than those of the commercial products. Then, the average pore radius by the mercury injection method is a magnitude determined by applying pressure from outside and, therefore, is affected by the minimum pore radius. The average pore radius by the amount of blood plasma

TABLE 3

| | | Liquid paraffin content (phr) | Molding temperature (°C.) | Amount discharged (g/min) | Winding speed (m/min) | Cooling and solidifying liquid | Temperature (°C.) | distance of fall (mm) | Heat set (°C.) | Shape (μm) Inside diameter | Thickness |
|---|---|---|---|---|---|---|---|---|---|---|---|
| Example | 12 | 119 | 180 | 3.34 | 80 | Liquid paraffin | 30 (70 sec.) | 21.5 | 100-110 | 198 | 44 |
| Example | 13 | " | " | " | " | Liquid paraffin | 30 (70 sec.) | " | " | 199 | 44 |
| Control | 11 | — | — | — | — | — | — | — | — | 195 | 21 |
| Control | 12 | — | — | — | — | — | — | — | — | 195 | 21 |

| | | Mini-module | | | | Amount of water permeated (m./min · m$^2$ · atm.) | bubble point (kg/cm$^2$) | Amount of blood plasma permeated (ml/min · m$^2$ · atm.) |
|---|---|---|---|---|---|---|---|---|
| | | Available length (mm) | Number of fibers | Available membrane area (m$^2$) | O$_2$ gas flux (lit/min · m$^2$ · atm.) | | | |
| Example | 12 | 140 | 312 | 2.72 × 10$^{-2}$ | 461 | 873 | 0.83 | 77.2 |
| " | 13 | 140 | 312 | 2.73 × 10$^{-2}$ | 429 | 780 | 0.73 | 70.4 |
| Control | 11 | 140 | 312 | 2.68 × 10$^{-2}$ | 1206 | 2626 | 0.30 | 371.8 |
| " | 12 | 140 | 312 | 2.66 × 10$^{-2}$ | 1208 | 2940 | 0.31 | 291.7 |

TABLE 4

| | | Average pore radius(A) | | | |
|---|---|---|---|---|---|
| | | Scanning electron microscope method | Water permeation method | Mercury injection method | Blood plasma permeation method |
| Example | 12 | 492 | 347 | 454 | 178 |
| " | 13 | 514 | 318 | 398 | 188 |
| Control | 11 | 220 | 382 | 496 | 207 |
| " | 12 | 285 | 381 | 538 | 212 |

A review of the results given in Table 3 and Table 4 reveals that despite the following difference, though not large, in the average particle radius between the hollow fiber membranes of the present invention and the commercially available countertypes by the stretching method, the values of amount of water permeated and permeated is a magnitude calculated from the permeation coefficient of albumin and, therefore, serves as one criterion for judgment of leakage of blood plasma.

As described above, this invention provides a porous polypropylene hollow fiber membrane of a circular cross section 150 to 300 μm in inside diameter and 10 to 150 μm in wall thickness for use in an artificial lung, which hollow fiber membrane is characterized by having an inner surface aperture ratio in the range of 10 to 30%, a porosity in the range of 10 to 60%, and an oxygen flux in the range of 100 to 1,000 liters/min.m$^2$.atm. and inducing no leakage of blood plasma within 20 hours use in the external circulation of blood therethrough. Thus, this hollow fiber membrane proves highly advantageous for use in an artificial lung because it retains its high gas-exchange capacity through a protracted service in the external circulation of blood without entailing any leakage of blood plasma. This characteristic feature manifests more conspicuously when the solid phase on the inner surface of the hollow fiber appears like particulate polypropylene intimately fused tightly after the pattern of a continuous phase while partly exposed on the surface, the solid phase inside the hollow fiber membrane has particulate polypropylene interlinked in the axial direction of fiber to form a multiplicity of polypropylene masses mutually bound with threads of polypropylene, and the solid phase on the outer surface of the hollow fiber membrane has threads of polypropylene containing particulate polypropylene reticularly bound coarsely, the interstices between these solid phases communicate with one another after the pattern of a three-dimensional network to give rise to continuous holes, the average particle diameter of the particulate polypropylene is in the range of 0.1 to 1.0 $\mu$m, the average pore diameter on the inner surface is in the range of 0.02 to 0.2 $\mu$m, and the specific surface area is in the range of 0.1 to 1.0 $\mu$m, the maximum value of the pore diameter distribution curve of the whole membrane is in the range of 10 to 40 $m^2/g$, when the oxygen permeation coefficient is in the range of 140 to 1,400 liters/min.$m^2$.atm. and the ultimate amount of oxygen permeated is in the range of 200 to 2,000 liters/min.$m^2$.atm. more desirably when the oxygen flux is not less than 150 liters/min.$m^2$.atm., the ratio of the oxygen flux to the inner surface aperture ratio is in the range of 7:1 to 30:1, and the ratio of the oxygen flux to the inner surface aperture ratio is in the rangeof 2:1 to 13:1, further when the quotient obtained by dividing the value of the oxygen flux by the aforementioned aperture ratio and the aforementioned porosity is not more than 0.7, the average particle diameter of the particulate polypropylene is in the range of 0.3 to 0.5 $\mu$m, the average pore diameter of the inner surface is in the range of 0.3 to 0.6 $\mu$m, the maximum of the pore diameter distribution curve of the whole membrane is in the range of 0.02 to 0.2 $\mu$m, the specific surface area is in the range of 10 to 40 $m^2/g$, the oxygen permeation coefficient is in the range of 400 to 900 liters/min.$m^2$.atm, and the ultimate amount of oxygen permeated is in the range of 600 to 1,200 liters/min.$^2$.atm.

This invention further provides a method for the manufacture of a hollow fiber membrane, characterized by the steps of mixing polypropylene, an organic filler capable of uniformly dispersing in the polypropylene in a fused state and easily dissolving in an extractant being used, and a crystal seed forming agent, causing the resulting mixture in a molten state to be discharged in the shape of a hollow fiber through an annular spinning nozzle, forwarding the hollow thread into contact with a liquid made of the organic filler or a compound similar thereto thereby cooling and solidifying the hollow fiber, and forwarding the cooled and solidified the hollow fiber into contact with an extractant incapable of dissolving polypropylene thereby depriving the hollow fiber of the organic filler. During the course in which the spinning dope uniformly dispersed in a molten state is cooled and solidified, numerous fine pores can be formed between the particles of polypropylene by causing phase separation of the organic filler from polypropylene in the spinning dope by use of the cooling and solidifying liquid incapable of extracting the organic filler and possessed of proper viscosity and subsequently extracting the organic filler. Moreover, the hollow fiber membrane possessing the outstanding properties mentioned above can be manufactured stably and uniformly without entailing the phenomenon that part of the low molecular component of polypropylene mingles into the cooling and solidifying liquid, adheres to the hollow fiber on aging as when a sbsutance capable of dissolving the organic filler is used as the cooling and solidifying liquid (as when a halogenated hydrocarbon is used as a cooling and solidifying liquid where liquid paraffin is used as an organic filler). The pahse separation can be regulated as desired by suitably selecting the amount of the organic filler to be incorporated, the cooling temperature, the cooling and solidifying liquid, the extractant, and the spinning draft ratio, for example. The effects mentioned above are manifested more conspicuously when liquid paraffin is used as the organic filler.

Further, this invention provides a hollow fiber membrane type artificial lung, characterized by using as a gas-exchang membrane a porous polypropylene hollow fiber membrane of a circular cross section 150 to 300 m in inside diameter and 10 to 150 m in wall thickness, which hollow fiber membrane has an inner surface aperture ratio in the range of 10 to 30%, a porosity in the range of 10 to 60%, and an oxygen gas flux in the range of 100 to 1,000 liters/min.$m^2$.atm., and inducing no leakage of blood plasma within 20 hours' use in the external circulation of blood therethrough. This artificial lung enjoys an out-standing performance, retaining the ability to add oxygen to blood and the ability to remove carbon dioxide gas from blood during its protracted service in the external circulation of blood without inducing any leakage of blood or blood plasma. The hollow fiber membrane type artificial lung manifests its performance more conspicuously when the hollow fiber membrane use therein is such that the solid phase on the inner surface of the hollow fiber has particulate polypropylene intimately fused tightly after the pattern of a continuous pahse while partly exposed on the surface, the solid phase inside the hollow fiber membrane has particulate polypropylene interlinked in the axial direction of fiber to form a multiplicity of polypropylene masses mutually bound with threads of polypropylene, and the solid phase on the outer surface of the hollow fiber membrane has fibers of polypropylene containing particulate polypropylene reticularly bound coarsely, the interstices between these solid phases communicate with one another after the pattern of a three dimensional network to give rise to continuous holes, the average particle diameter of the particulate polypropylene is in the range of 0.1 to 1.0 $\mu$m, the average pore diameter on the inner surface is in the range of 0.1 to 1.0 $\mu$m, the maximum value of the pore diameter distribution curve of the whole membrane is in the range of 0.02 to 0.2 $\mu$m, and the specific surface area is in the range of 10 to 40 $m^2/g$, and especially when the hollow fiber membrane has an oxygen permeation coefficient in the range of 140 to 1,400 liters/min.$m^2$.atm. and an ultimate amount of oxygen permeated in the range of 200 to 2,000 liters/min.$m^2$.atm.

What is claimed is:

1. A porous polypropylene hollow fiber membrane of a circular cross section 150 to 300 $\mu$m in inside diameter and 10 to 150 $\mu$m in wall thickness for use in an atificial lung, which hollow fiber membrane is characterized by having an inner surface aperture ratio in the range of 10 to 30%, a porosity in the range of 10 to 60%, and an oxygen flux in the range of 100 to 1,000 liters/min.$m^2$.atm. and inducing no leakage of blood plasma within 30 hours use with circulation of blood therethrough; said inner surface of the hollow fiber having a solid phase of particulate polypropylene intimately fused tightly in the pattern of a continuous phase while partly exposed on the surface; the inside of the hollow fiber membrane having particulate polypropylene interlinked in the axial direction of fiber to form a multiplicity of polypropylene masses mutually bound with fibers of polypropylene; and the outer surface of the hollow fiber membrane having a solid phase of threads of polypropylene containing particulate polypropylene reticularly bound coarsely; and wherein those solid phases form interstices therebetween; the interstices communicating with one another in a three-dimensional network to give rise to continuous holes communicating the inner surface with the outer surface; an average particle diameter of the particulate polypropylene being in the range of 0.1 to 1.0 $\mu$m, the average pore diameter on the inner surface being in the range of 0.1 to 1.0 $\mu$m, a maximum value of the pore diameter distribution curve of the whole membrane being in the range of 0.02 to 0.2 $\mu$m, and the specific area being in the range of 10 to 40 $m^2/g$.

2. The hollow fiber membrane according to claim 1, further having an oxygen permeation coefficient of 140 to 1,400 liters/min.$m^2$.atm. and having an ultimate amount of oxygen permeated in the range of 200 to 2,000 liters/min.$m^2$. atm.

3. The hollow fiber membrane according to claim 1, wherein said oxygen flux is not less than 150 liters/min.$m^2$.atm.

4. The hollow fiber membrane according to claim 1, wherein the ratio of said oxygen flux to said aperture ratio of the inner surface is in the range of 7:1 to 30:1.

5. The hollow fiber membrane according to claim 1, wherein the ratio of said oxygen flux to said porosity is in the range of 2:1 to 13:1.

6. The hollow fiber membrane according to claim 1, wherein the ratio of the numerical value of said oxygen flux to said aperture ratio and said porosity is not more than 0.7.

7. The hollow fiber membrane according to claim 1, which has a substantially true circular cross section wherein the inside diameter is in the range of 180 to 250 $\mu$m and the wall thickness is in the range of 40 to 50 $\mu$m.

8. The hollow fiber membrane according to claim 1, wherein the average particle diameter of particulate polypropylene is in the range of 0.3 to 0.5 $\mu$m, the average pore diameter in the inner surface is 0.3 to 0.6 $\mu$m, the polypropylene further having a maximum value in the pore diameter distribution curve of the whole membrane of 0.02 to 0.2 $\mu$m, and a specific surface area of 10 to 40 $m^2/g$.

9. The hollow fiber membrane according to claim 2, wherein the oxygen permeation coefficient is in the range of 400 to 900 liters/min.$m^2$.atm. and the ultimate amount of oxygen permeated is in the range of 600 to 1,200 liters/min.$m^2$.atm.

10. A hollow fiber membrane type artificial lung, having a housing with a blood inlet, a blood outlet, a gas inlet, a gas outlet and a gas-exchange membrane comprising a porous polypropylene hollow fiber membrane having a circular cross section of 150 to 300 $\mu$m in inside diameter and 10 to 150 $\mu$m in wall thickness, which hollow fiber membrane has an inner surface aperture ratio of 10 to 30%, a porosity of 10 to 60%, and an oxygen gas flux of 100 to 1,000 liters/min.$m^2$.atm., and inducing no leakage of blood plasma within 30 hours use in the circulation of blood therethrough; and wherein said inner surface of the hollow fiber has a solid phase of a particulate polypropylene intimately fused tightly in the pattern of a continuous phase while partly exposed on the surface; the inside of the hollow fiber membrane has particulate polypropylene interlinked in the axial direction of fiber to form a multiplicity of polypropylene masses mutually bound with fibers of polypropylene; and the outer surface of the hollow fiber membrane has a solid phase of fibers of polypropylene containing particulate polypropylene reticularly bound coarsely; the interstices between these solid phases communicating with one another to form a three-dimensional network to give rise to continuous holes which commute between the inner surface and the outer surface, the average particle diameter of the particulate polypropylene being 0.1 to 1.0 $\mu$m, the average pore diameter on the inner surface being 0.1 to 1.0 $\mu$m, the maximum value of the pore diameter distribution curve of the whole membrane being 10 to 40 $m^2/g$.

11. A hollow fiber membrane type artificial lung according to claim 10, wherein said hollow fiber membrane has an oxygen permeation coefficient in the range of 140 to 1,400 liters/min.$m^2$.atm. and an ultimate amount of oxygen permeated in the range of 200 to 2,000 liters/min.$m^2$.atm.

* * * * *

UNITED STATES PATENT AND TRADEMARK OFFICE
CERTIFICATE OF CORRECTION

PATENT NO. : 4,770,852
DATED : September 13, 1988
INVENTOR(S) : TAKAHARA et al It is certified that error appears in the above-identified patent and that said Letters Patent is hereby corrected as shown below:

```
Column 3,  line 13, change "in" to --the.
Column 4,  line 41, change "was" to --has--.
Column 9,  line 37, change "enought" to --enough--.
Column 11, line 14, change "on" to --one--.
Column 12, line 16, change "an" to --and--.
Column 13, line 27, change "dirve" to --drive--.
Column 15, line 1,  change "t=d₁d-d₂" to --t=d₁-d₂--.
Column 24, line 9,  change "pahse" to --phase--.
Column 24, line 19, change "exchang" to --exchange--.
Column 24, line 38, change "pahse" to --phase--.
```

Signed and Sealed this

Eighth Day of September, 1992

*Attest:*

DOUGLAS B. COMER

*Attesting Officer*  *Acting Commissioner of Patents and Trademarks*